(12) United States Patent
Griffiths et al.

(10) Patent No.: US 9,650,990 B2
(45) Date of Patent: May 16, 2017

(54) SEAL RETENTION ASSEMBLY AND A SEAL

(71) Applicant: GM GLOBAL TECHNOLOGY OPERATIONS LLC, Detroit, MI (US)

(72) Inventors: Leonard Barry Griffiths, Fenton, MI (US); David R. Staley, Flushing, MI (US)

(73) Assignee: GM Global Technology Operations LLC, Detroit, MI (US)

(*) Notice: Subject to any disclaimer, the term of this patent is extended or adjusted under 35 U.S.C. 154(b) by 414 days.

(21) Appl. No.: 13/758,004

(22) Filed: Feb. 4, 2013

(65) Prior Publication Data

US 2014/0216389 A1    Aug. 7, 2014

(51) Int. Cl.
    F02B 77/00      (2006.01)
    F02F 11/00      (2006.01)
    F02F 7/00       (2006.01)
    F16J 15/3252    (2016.01)
    F16J 15/3268    (2016.01)

(52) U.S. Cl.
    CPC ............ F02F 11/00 (2013.01); F02F 7/0073 (2013.01); F16J 15/3252 (2013.01); F16J 15/3268 (2013.01); F02F 2007/0075 (2013.01)

(58) Field of Classification Search
    CPC ............ F02F 7/0058; F02F 2007/0075; F02F 7/0073; F02F 11/00; F16J 15/3252
    USPC ......................... 123/195 C, 197.1
    See application file for complete search history.

(56) References Cited

U.S. PATENT DOCUMENTS

| | | | |
|---|---|---|---|
| 3,291,495 A | * | 12/1966 | Liebig ................. F16J 15/3224 277/577 |
| 4,614,444 A | | 9/1986 | Hines et al. |
| 2007/0000469 A1 | * | 1/2007 | Liang et al. ............. 123/195 R |

FOREIGN PATENT DOCUMENTS

| | | |
|---|---|---|
| CN | 87217000 U | 11/1988 |
| CN | 201206509 Y | 3/2009 |
| CN | 202360241 U | 8/2012 |
| EP | 0727575 A1 | 8/1996 |
| GB | 2298008 A * | 8/1996 ............ F02F 11/007 |

* cited by examiner

Primary Examiner — Stephen K Cronin
Assistant Examiner — Omar Morales
(74) Attorney, Agent, or Firm — Quinn IP Law

(57) ABSTRACT

A seal retention assembly is disclosed. The seal retention assembly includes a cover defining an aperture along a longitudinal axis. The seal retention assembly further includes a seal coupled to the cover adjacent to the aperture. The seal retention assembly also includes a retention device cooperating with the cover and the seal to secure the seal in engagement with the cover.

In addition, a seal is disclosed. The seal includes a body portion, with the body portion including a first side and a second side opposing each other along a longitudinal axis. The body portion also includes an outer periphery disposed between the first and second sides and faces away from the longitudinal axis. The seal further includes a first retainer extending from at least one of the outer periphery and the first and second sides for securing the body portion to a cover.

17 Claims, 2 Drawing Sheets

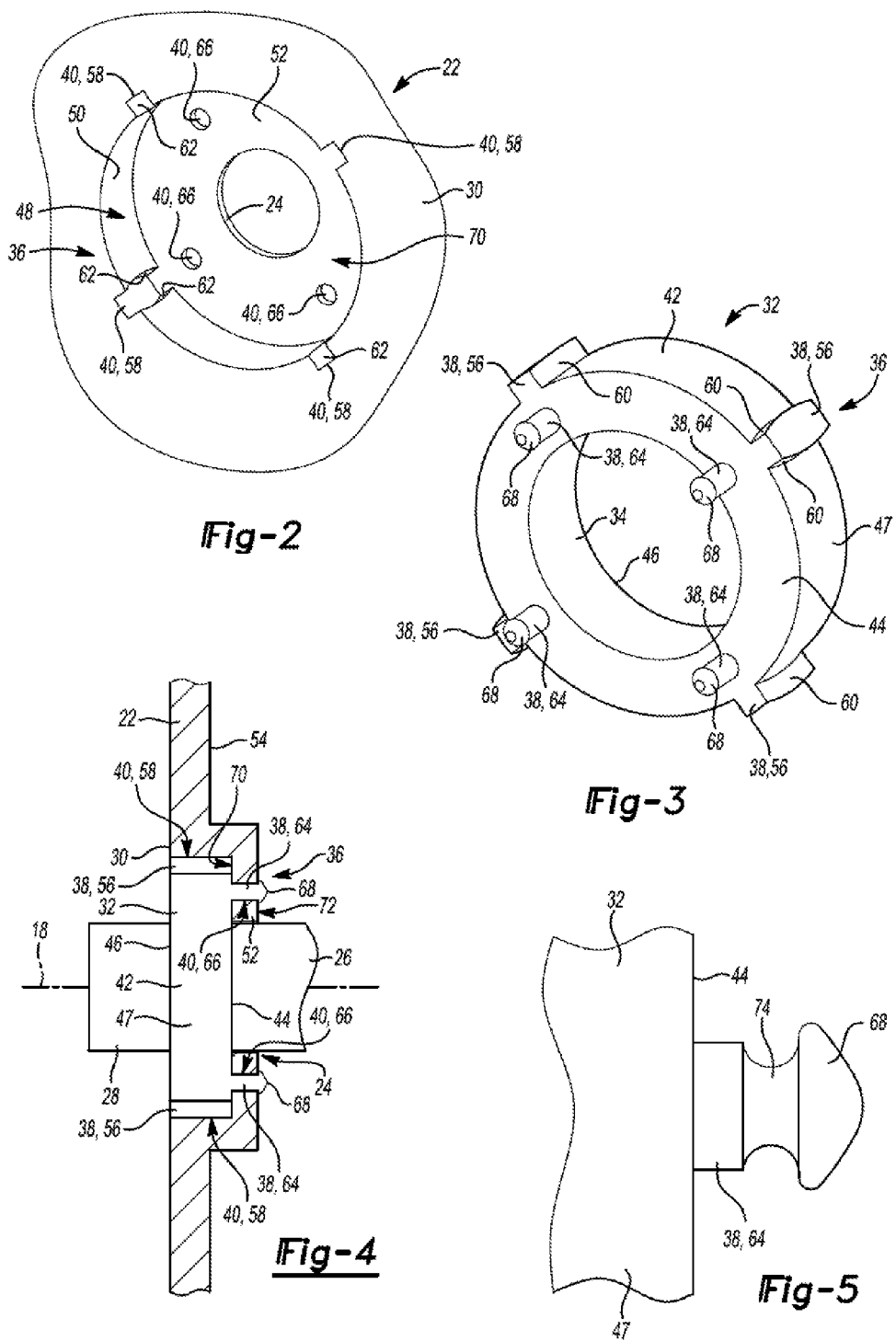

SEAL RETENTION ASSEMBLY AND A SEAL

TECHNICAL FIELD

The present disclosure relates to a seal retention assembly and a seal.

BACKGROUND

A crankshaft of an engine can convert linear motion from reciprocating pistons into rotational motion. Generally, the crankshaft can protrude out of a cylinder block of the engine and is rotatable in response to the linear motion of the reciprocating pistons. The crankshaft can extend through a timing cover coupled to the cylinder block. The timing cover generally covers and protects timing gears, belts, and/or chains of the engine. Often, a crankshaft seal can be disposed between the crankshaft and the timing cover to prevent lubricant loss from the engine and/or contamination of the gears, belts, and chains. Crankshaft seals have a tendency to translate along the crankshaft.

SUMMARY

The present disclosure provides a seal retention assembly including a cover defining an aperture along a longitudinal axis. The seal retention assembly further includes a seal coupled to the cover adjacent to the aperture. In addition, the seal retention assembly includes a retention device cooperating with the cover and the seal to secure the seal in engagement with the cover.

The present disclosure further provides a seal including a body portion. The body portion includes a first side and a second side opposing each other along a longitudinal axis. The body portion includes an outer periphery disposed between the first and second sides and faces away from the longitudinal axis. The seal also includes a first retainer extending from at least one of the outer periphery and the first and second sides for securing the body portion to a cover.

The present disclosure also provides a seal retention assembly for a vehicle. The seal retention assembly includes an engine block defining a bore along a longitudinal axis. The seal retention assembly also includes a cover coupled to the engine block and defines an aperture along the longitudinal axis. The cover defines a recess along the longitudinal axis to present an inner wall disposed radially relative to the longitudinal axis and a base transverse to the longitudinal axis, with the recess and the aperture cooperating with each other. The seal retention assembly further includes a crankshaft disposed in the engine block and rotatable about the longitudinal axis. The crankshaft includes a first end extending through the bore, the aperture and the recess. The seal retention assembly also includes a seal and a retention device. The seal includes a first side and a second side opposing each other along the longitudinal axis. The seal defines an opening through the first and second sides to receive the first end of the crankshaft. The seal includes an outer periphery disposed between the first and second sides and spaced from the longitudinal axis. The retention device includes a plurality of first retainers spaced from each other radially relative to the longitudinal axis and a plurality of second retainers spaced from each other radially relative to the longitudinal axis. The first retainers extend from at least one of the first and second sides and the outer periphery of the seal. The second retainers are defined in at least one of the inner wall and the base of the cover. The first and second retainers engage each other to secure the seal in the recess of the cover.

Generally, the seal retention assembly secures the seal to the cover to prevent the seal from walking out of the cover under certain conditions, such as for example, during rotation of a shaft, such as the crankshaft. In other words, the seal retention assembly provides a positive retention between the seal and the cover such that the seal does not translate along the longitudinal axis to separate from the cover under certain conditions. As such, the seal provides a first retainer to secure the seal to the cover.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 2 is a schematic perspective view of a cover.

FIG. 3 is a schematic perspective view of a seal.

FIG. 4 is a schematic broken cross-sectional view of the cover, with the seal coupled to the cover and a crankshaft disposed through the seal and the cover.

FIG. 5 is a schematic broken side view of a post.

DETAILED DESCRIPTION

Figure 1:
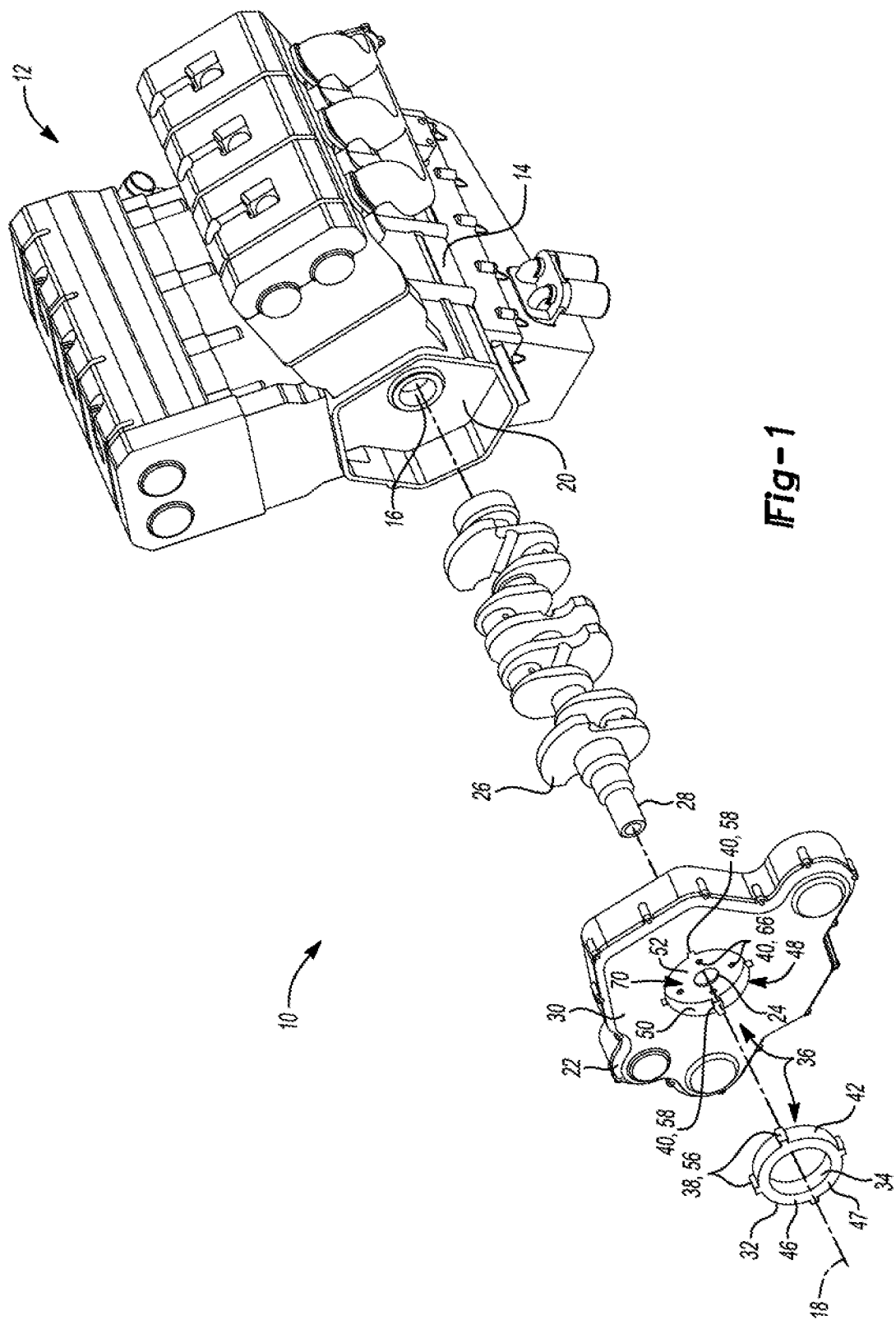
FIG. 1 is a schematic exploded perspective view of a seal retention assembly.

Referring to the Figures, wherein like numerals indicate like or corresponding parts throughout the several views, a seal retention assembly 10 is generally shown in FIG. 1. In certain embodiments, the seal retention assembly 10 can be utilized for a vehicle, such as for example, an automotive vehicle. Generally, the automotive vehicle can include an internal combustion engine 12 as shown in FIG. 1. It is to be appreciated that the seal retention assembly 10 can also be useful for non-automotive applications including, for example, aviation applications.

Referring to FIG. 1, the seal retention assembly 10 can include a component 14 defining a bore 16 along a longitudinal axis 18. In certain embodiments, the component 14 can be an engine block 14 defining the bore 16 along the longitudinal axis 18. In various embodiments, the engine block 14 can include a side wall 20 defining the bore 16 along the longitudinal axis 18. Generally, the engine block 14 can be a cylinder block of the internal combustion engine 12. Furthermore, the engine block 14 can be formed from a metal, such as, but not limited to, cast iron or an aluminum alloy.

The seal retention assembly 10 can also include a cover 22 (see FIGS. 1 and 2) coupled to the component 14, and in certain embodiments, coupled to the engine block 14. Generally, the cover defines an aperture 24 along the longitudinal axis 18. In certain embodiments, the cover 22 is coupled to the side wall 20 of the engine block 14. The cover 22 can be a timing cover 22 and can be configured to protect gears, timing chains and/or belts, and the like of the internal combustion engine 12. More specifically, the cover 22 can be configured to sealingly attach to the engine block 14 so that the gears, timing chains and/or belts can be lubricated by oil. Although the cover 22 is shown as generally coupled to a front side wall of the internal combustion engine 12 in FIG. 1, e.g., at a crank pulley, the cover 22 can alternatively be coupled to a rear side wall of the internal combustion engine 12, e.g., at a flywheel. Furthermore, the cover 22 can be formed from a plastic or composite, such as, but not limited to, acrylonitrile butadiene styrene, glass-reinforced polyamide, glass-reinforced nylon, etc.

Continuing with FIG. 1, the seal retention assembly 10 can further include a shaft 26 disposed in the component 14 and rotatable about the longitudinal axis 18. In certain embodiments, the shaft 26 can be a crankshaft 26 disposed in the engine block 14, with the crankshaft 26 rotatable about the longitudinal axis 18. That is, the crankshaft 26 can be configured to convert linear motion from a plurality of reciprocating pistons disposed within the engine block 14 into rotational motion about the longitudinal axis 18. Generally, the shaft 26 can include a first end 28 extending through the bore 16 of the component 14 and the aperture 24 of the cover 22. More specifically, the crankshaft 26 includes the first end 28 extending through the bore 16 and the aperture 24. Simply stated, the first end 28 protrudes out of the engine block 14 and the cover 22. The aperture 24 of the cover 22 and the bore 16 of the engine block 14 can each have a generally circular configuration or each can have any other suitable configuration for receiving the first end 28 of the crankshaft 26. In one embodiment, the longitudinal axis 18 can be substantially perpendicular to the front or rear side walls 20 of the engine block 14 and/or to an exterior surface 30 of the cover 22.

Turning to FIGS. 1 and 3, the seal retention assembly 10 also includes a seal 32 coupled to the cover 22 adjacent to the aperture 24. Generally, the seal 32 can seal between the cover 22 and the first end 28 of the crankshaft 26 to prevent lubricant loss from the internal combustion engine 12 and/or contamination of the gears, timing chains and/or belts. The seal 32 can define an opening 34 along the longitudinal axis 18 to receive the first end 28 of the shaft 26, and in certain embodiments, to receive the first end 28 of the crankshaft 26. Simply stated, the seal 32 surrounds a portion of the first end 28 of the crankshaft 26. Therefore, the first end 28 is disposed through the opening 34 and can rotate about the longitudinal axis 18 independently of the seal 32. In other words, the seal 32 remains generally stationary as the crankshaft 26 rotates. As discussed in detail below, the seal 32 is attached or secured to the cover 22 such that the seal 32 generally does not rotate about the longitudinal axis 18 nor translate along the longitudinal axis 18 to separate from the cover 22 during, for example, rotation of the crankshaft 26. It is to be appreciated that the seal 32 can be press-fit to the cover 22 or coupled to the cover 22 by any other suitable method. It is to further be appreciated that the seal 32 can be referred to as a crankshaft seal.

As best shown in FIGS. 2 and 3, the seal retention assembly 10 further includes a retention device 36 cooperating with the cover 22 and the seal 32 to secure the seal 32 in engagement with the cover 22. Therefore, the seal 32 remains secured to the cover 22 during, for example, rotation of the crankshaft 26. In other words, the seal 32 does not translate along the longitudinal axis 18 to separate from the cover 22. Furthermore, the seal 32 does not rotate about the longitudinal axis 18 which can cause the seal 32 to separate from the cover 22. As such, the retention device 36 provides a positive retention between the seal 32 and the cover 22 such that the seal 32 remains secured to the cover 22 under certain conditions, such as during rotation of the crankshaft 26.

Generally, the retention device 36 includes a first retainer 38 extending from one of the cover 22 and the seal 32 and engaging an other one of the cover 22 and the seal 32 to secure the seal 32 to the cover 22. Furthermore, the retention device 36 includes a second retainer 40 defined in one of the cover 22 and the seal 32, with the first and second retainers 38, 40 engaging each other to secure the seal 32 to the cover 22. In one embodiment, as best shown in FIGS. 2 and 3, the first retainer 38 extends from the seal 32 and the second retainer 40 is defined in the cover 22.

In certain embodiments, the first retainer 38 is further defined as a plurality of first retainers 38 spaced from each other and the second retainer 40 is further defined as a plurality of second retainers 40 spaced from each other. Therefore, in this embodiment, each of the first retainers 38 engage the cover 22 to secure the seal 32 to the cover 22, and more specifically, each of the first retainers 38 engage respective second retainers 40 to secure the seal 32 to the cover 22. In certain embodiments, the first retainers 38 are spaced from each other radially relative to the longitudinal axis 18 and the second retainers 40 are spaced from each other radially relative to the longitudinal axis 18.

Turning to FIGS. 1, 3 and 4, the seal 32 can include an outer periphery 42 facing away from the longitudinal axis 18. The seal 32 can also include a first side 44 and a second side 46 opposing each other along the longitudinal axis 18. Generally, the outer periphery 42 is disposed between the first and second sides 44, 46 and spaced from the longitudinal axis 18. The opening 34 of the seal 32 is disposed through the first and second sides 44, 46 to receive the first end 28 of the crankshaft 26. Simply stated, in one embodiment, the seal 32 can generally present an annular configuration. That is, the seal 32 can be a generally ring-shaped configuration. It is to be appreciated that the seal 32 can be any suitable configuration.

More specifically, the seal 32 can include a body portion 47, with the body portion 47 including the first and second sides 44, 46 opposing each other along the longitudinal axis 18. Furthermore, the body portion 47 can include the outer periphery 42 facing away from the longitudinal axis 18 and the body portion 47 can define the opening 34 through the first and second sides 44, 46 along the longitudinal axis 18. Generally, the first retainer 38, and more specifically the first retainers 38, are spaced from the opening 34. Furthermore, the first retainer 38, and more specifically the first retainers 38, extend from at least one of the outer periphery 42 and the first and second sides 44, 46.

Furthermore, the seal 32 can be at least partially formed of an elastomer, such as for example, rubber. Therefore, the seal 32 can include an inner support formed of a composite, such as a plastic composite, a metal, and/or nylon and the seal 32 can include an outer shell formed of the elastomer. Simply stated, the outer shell surrounds the inner support. Generally, the outer shell can be molded, such as over-molded, to the inner support. It is to be appreciated that the outer shell can be formed to the inner support by any other suitable method. It is to also be appreciated that, in certain embodiments, the seal 32 can be entirely formed of the elastomer.

Continuing with FIG. 3, generally, the first retainer 38, and more specifically the first retainers 38, extend from at least one of the first and second sides 44, 46 and the outer periphery 42 of the seal 32. In one embodiment, the first retainer 38, and more specifically the first retainers 38, extend from the outer periphery 42. In another embodiment, the first retainer 38, and more specifically the first retainers 38, extend from one of the first and second sides 44, 46. In yet another embodiment, the first retainers 38 extend from both the outer periphery 42 and one of the first and second sides 44, 46. Each of these embodiments are discussed further below.

Turning to FIGS. 1, 2 and 4, the cover 22 can define a recess 48 along the longitudinal axis 18 to present an inner wall 50 disposed radially relative to the longitudinal axis 18. More specifically, the cover 22 can define the recess 48 to present the inner wall 50 disposed radially relative to the longitudinal axis 18 and a base 52 transverse to the longitudinal axis 18. Generally, the recess 48 and the aperture 24 cooperate with each other. For example, the recess 48 and the aperture 24 cooperate such that the first end 28 of the crankshaft 26 extends through both the aperture 24 and the recess 48. Therefore, the first end 28 of the crankshaft 26 extends through the bore 16, the aperture 24 and the recess 48. In certain embodiments, the aperture 24 and the bore 16 are coaxial relative to the longitudinal axis 18. The first and second retainers 38, 40 engage each other to secure the seal 32 in the recess 48 of the cover 22. As such, the retention device 36 provides that the seal 32 remains seated in the recess 48 of the cover 22. In other words, the retention device 36 prevents the seal 32 from translating out of the recess 48 of the cover 22. Simply stated, the retention device 36 prevents the seal 32 from walking out of the recess 48 of the cover 22. The recess 48 can recede from the exterior surface 30 of the cover 22 as best shown in FIGS. 1 and 4. It is to be appreciated that the recess 48 can recede from an interior surface 54 of the cover 22 generally opposing the exterior surface 30. Therefore, the second side 46 of the seal 32 can be disposed adjacent to the exterior surface 30 when the recess 48 recedes from the exterior surface 30 and the second side 46 of the seal 32 can be disposed adjacent to the interior surface 54 when the recess 48 recedes from the interior surface 54.

Continuing with FIG. 2, generally, the second retainer 40, and more specifically the second retainers 40, are defined in at least one of the inner wall 50 and the base 52 of the cover 22. In one embodiment, the second retainer 40, and more specifically the second retainers 40, are defined in the inner wall 50. In another embodiment, the second retainer 40, and more specifically the second retainers 40, are defined in the base 52. In yet another embodiment, the second retainers 40 are defined in both the inner wall 50 and the base 52. Each of these embodiments are discussed further below.

As mentioned above, in one embodiment, the first retainers 38 extend from the outer periphery 42 and the second retainers 40 extend from inner wall 50. Referring to FIG. 3, specifically, in this embodiment, the first retainers 38 can be defined as fingers 56 extending outwardly from the outer periphery 42. Generally, the fingers 56 engage the cover 22 to secure the seal 32 to the cover 22. Furthermore, referring to FIG. 2, in this embodiment, the second retainers 40 are defined as slots 58 disposed in the inner wall 50. Generally, the seal 32 is disposed in the recess 48 such that the fingers 56 are disposed in respective slots 58 to secure the seal 32 to the cover 22.

Optionally, each of the fingers 56 can include one or more contoured portions 60 (see FIG. 3) for inserting the fingers 56 into respective slots 58 and/or securing the fingers 56 in respective slots 58. In certain embodiments, the contoured portions 60 of the fingers 56 have an arcuate or curved configuration, such as for example, a convex configuration. Generally, the ends of the fingers 56 are narrower than a middle portion of the fingers 56. Furthermore, optionally, the slots 58 can also include one or more contoured portions 62 (see FIG. 2) complimentary to the contoured portions 60 of the fingers 56 for receiving respective fingers 56 and/or securing the fingers 56 in respective slots 58. In certain embodiments, the contoured portions 62 of the slots 58 have an arcuate or curved configuration. Specifically, the ends of the slots 58 are narrower than a middle portion of the slots 58 similar to the configuration of the fingers 56 such that the fingers 56 and slots 58 are complimentary to each other.

As also mentioned above, in another embodiment, the first retainers 38 extend outwardly from one of the first and second sides 44, 46. In this embodiment, the first retainers 38 are defined as posts 64 (see FIG. 3) extending outwardly from one of the first and second sides 44, 46 of the seal 32 and the second retainers 40 can be defined as holes 66 (see FIG. 2) disposed through the base 52. For example, in one embodiment as best shown in FIGS. 3 and 4, the first retainers 38 can extend outwardly from the first side 44. As another example, in another embodiment, the first retainers 38 can extend outwardly from the second side 46. The seal 32 is disposed in the recess 48 such that the posts 64 are disposed through respective holes 66 to secure the seal 32 to the cover 22.

Turning to FIGS. 4 and 5, each of the posts 64 can extend to distal ends, with each of the distal ends having a head 68. More specifically, the base 52 can include a first surface 70 and a second surface 72 spaced from each other along the longitudinal axis 18, with the holes 66 defined through the first and second surfaces 70, 72. Therefore, the head 68 of the posts 64 can be disposed through respective holes 66 such that the head 68 of the posts 64 engaging the second surface 72 of the base 52 adjacent to respective holes 66 to secure the seal 32 in the recess 48 of the cover 22. Optionally, the head 68 of each of the posts 64 can be tapered (see FIGS. 4 and 5) for easily guiding or inserting the posts 64 through respective holes 66. Furthermore, optionally, as shown in FIG. 5, each of the posts 64 can define a groove 74 for receiving or seating the base 52 in the groove 74 to secure the seal 32 to the cover 22.

In addition as mentioned above, in yet another embodiment, the first retainers 38 extend from both the outer periphery 42 and one of the first and second sides 44, 46, and the second retainers 40 are defined in both the inner wall 50 and the base 52. Turning to FIGS. 2 and 3, in this embodiment, a first apportionment of the first retainers 38 extend outwardly from the outer periphery 42 and a second apportionment of the first retainers 38 extend outwardly from one of the first and second sides 44, 46. Furthermore, a first apportionment of the second retainers 40 are disposed in the inner wall 50 and a second apportionment of the second retainers 40 are disposed in the base 52. Generally, in this embodiment, the first apportionment of the first retainers 38 engage the respective first apportionment of the second retainers 40 and the second apportionment of the first retainers 38 engage the respective second apportionment of the second retainers 40. The first apportionment of the first retainers 38 are defined as fingers 56 as discussed above, the second apportionment of the first retainers 38 are defined as posts 64 as discussed above, the first apportionment of the second retainers 40 are defined as slots 58 disposed in the inner wall 50 as discussed above and the second apportionment of the second retainers 40 are defined as holes 66 disposed through the base 52 as discussed above.

Again, the first and second retainers 38, 40 engage each other to secure the seal 32 to the cover 22 which prevents the seal 32 from translating along the longitudinal axis 18 and separating from the cover 22. It is to be appreciated that the first and second retainers 38, 40 can be other configurations than discussed above and illustrated in the Figures.

While the best modes for carrying out the disclosure have been described in detail, those familiar with the art to which this disclosure relates will recognize various alternative designs and embodiments for practicing the disclosure within the scope of the appended claims.

The invention claimed is:

1. A seal retention assembly comprising:
a cover defining an aperture along a longitudinal axis, and defining a recess to present an inner wall disposed radially relative to the longitudinal axis and a base transverse to the longitudinal axis, with the aperture disposed through the base;
a seal coupled to the cover adjacent to the aperture, wherein the seal defines an opening along the longitudinal axis to present an inner surface radially spaced from the longitudinal axis and the inner surface faces the opening, and wherein the seal includes an outer periphery facing away from the longitudinal axis, and the inner surface opposes the outer periphery; and
a retention device cooperating with the cover and the seal to secure the seal in engagement with the cover;
wherein the retention device includes a first retainer extending from the seal and a second retainer defined in the cover;
wherein the first retainer includes a finger extending outwardly from the outer periphery of the seal;
wherein the second retainer is defined as a slot disposed in the inner wall which is open to the recess, and the slot is closed at one end by the base; wherein the slot is closed at one side by the cover;
wherein the seal is disposed in the recess and the finger is disposed in the slot.

2. An assembly as set forth in claim 1 wherein the first retainer is further defined as a plurality of first retainers spaced from each other radially relative to the longitudinal axis, and wherein the second retainer is further defined as a plurality of second retainers spaced from each other radially relative to the longitudinal axis, with each of the first retainers engaging respective second retainers to secure the seal to the cover.

3. An assembly as set forth in claim 1 wherein the first retainer is further defined as a plurality of first retainers spaced from each other and wherein the second retainer is further defined as a plurality of second retainers spaced from each other, with each of the first retainers engaging respective second retainers to secure the seal to the cover.

4. An assembly as set forth in claim 3 wherein the finger is defined as a plurality of fingers extending outwardly from the outer periphery away from the inner surface.

5. An assembly as set forth in claim 4 wherein the inner wall faces the longitudinal axis, with the recess and the aperture cooperating with each other, and wherein the slot is defined as a plurality of slots which are each defined in the inner wall which are open to the recess, and the slots are closed at one end by the base, with the seal disposed in the recess such that the inner wall and the outer periphery face each other, and the fingers are disposed in respective slots to secure the seal to the cover when the seal is disposed in the recess.

6. An assembly as set forth in claim 3 wherein the seal includes a first side and a second side opposing each other along the longitudinal axis, with the first retainers including a plurality of posts extending outwardly from one of the first and second sides of the seal.

7. An assembly as set forth in claim 6 wherein the inner wall faces the longitudinal axis and the base extending outwardly toward the longitudinal axis, wherein the recess and the aperture cooperate with each other along the longitudinal axis, and wherein the second retainers are defined as holes disposed through the base, with the seal disposed in the recess and the posts are disposed through respective holes to secure the seal to the cover.

8. An assembly as set forth in claim 7 wherein the base includes a first surface and a second surface spaced from each other along the longitudinal axis, with the first surface disposed in the recess and the second surface spaced from the recess, and with the holes defined through the first and second surfaces, wherein the holes are spaced from the aperture, and wherein each of the posts extend to distal ends, with each of the distal ends having a head, and with the head of the posts disposed through respective holes such that the head of the posts engaging the second surface of the base adjacent to respective holes to secure the seal in the recess of the cover.

9. An assembly as set forth in claim 3 wherein the seal includes a first side and a second side opposing each other along the longitudinal axis such that the outer periphery and the inner surface are disposed between the first and second sides, with a first apportionment of the first retainers extending outwardly from the outer periphery away from the inner surface and a second apportionment of the first retainers extending outwardly from one of the first and second sides, and wherein the first apportionment of the first retainers are defined as fingers and the second apportionment of the first retainers are defined as posts.

10. An assembly as set forth in claim 9 wherein the inner wall faces the longitudinal axis and the base extends outwardly toward the longitudinal axis, wherein the aperture is defined through the base such that the recess and the aperture cooperate with each other along the longitudinal axis, and with a first apportionment of the second retainers disposed in the inner wall and a second apportionment of the second retainers disposed in the base, and wherein the first apportionment of the first retainers engage the respective first apportionment of the second retainers and the second apportionment of the first retainers engage the respective second apportionment of the second retainers, and wherein the first apportionment of the second retainers are defined as slots disposed in the inner wall and the second apportionment of the second retainers are defined as holes disposed through the base.

11. An assembly as set forth in claim 1 further including a component defining a bore along the longitudinal axis, with the cover coupled to the component, and further including a shaft disposed in the component and rotatable about the longitudinal axis, with the shaft including a first end extending through the bore of the component and the aperture of the cover, and with the opening of the seal configured to receive the first end of the shaft.

12. A seal retention assembly for a vehicle, the assembly comprising: an engine block defining a bore along a longitudinal axis; a cover coupled to the engine block and defining an aperture along the longitudinal axis, with the cover defining a recess along the longitudinal axis to present an inner wall disposed radially relative to the longitudinal axis and a base transverse to the longitudinal axis, and with the recess and the aperture cooperating with each other, and the aperture is disposed through the base; a crankshaft disposed in the engine block and rotatable about the longitudinal axis, with the crankshaft including a first end extending through the bore, the aperture and the recess; a seal including a first side and a second side opposing each other along the longitudinal axis, with the seal defining an opening through the first and second sides to receive the first end of the crankshaft, and the seal presents an inner surface radially spaced from the longitudinal axis and the inner surface faces the opening, wherein the inner surface has a generally annular configuration, and wherein the seal includes an outer periphery disposed between the first and second sides and radially spaced from the longitudinal axis, with the inner surface opposing the outer periphery; and a retention device including a plurality of first retainers spaced from each other radially relative to the longitudinal axis and a plurality of second retainers spaced from each other radially relative to the longitudinal axis; wherein the first and second retainers engage each other to secure the seal in the recess of the cover; wherein the first retainers each include a finger extending outwardly from the outer periphery of the seal; wherein the second retainers are defined as a slot each disposed in the inner wall which are open to the recess, and the slots are closed at one end by the base; wherein the slots are closed at one side by the cover; wherein the seal is disposed in the recess and the fingers are disposed in respective slots.

13. A seal comprising:
   a body portion including a first side and a second side opposing each other along a longitudinal axis, with the body portion including an outer periphery disposed between the first and second sides and facing away from the longitudinal axis;
   a first retainer extending from at least one of the outer periphery and the first and second sides for securing the body portion to a cover;
   wherein the body portion defines an opening through the first and second sides along the longitudinal axis to present an inner surface radially spaced from the longitudinal axis, and the inner surface faces the opening, and wherein the inner surface has a generally annular configuration;
   wherein the first retainer includes a finger extending outwardly from the outer periphery of the seal;
   wherein the finger includes a contoured portion; and
   wherein the finger includes a first end and a second end, and the first and second ends of the finger are narrower than a middle portion of the finger.

14. A seal as set forth in claim 13 wherein the finger is further defined as a plurality of fingers spaced from each other.

15. A seal as set forth in claim 14 wherein the first retainers include a post extending outward from one of the first and second sides.

16. A seal as set forth in claim 15 wherein the post is further defined as a plurality of posts extending outwardly from one of the first and second sides along the longitudinal axis.

17. A seal as set forth in claim 13 wherein the first retainer is spaced from the opening.

* * * * *